(12) United States Patent
Dickie et al.

(10) Patent No.: US 7,241,016 B2
(45) Date of Patent: Jul. 10, 2007

(54) PROJECTOR ALIGNMENT METHOD AND USER INTERFACE

(75) Inventors: James P. Dickie, Corvallis, OR (US); Robert M. Schneider, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 264 days.

(21) Appl. No.: 10/971,965

(22) Filed: Oct. 22, 2004

(65) Prior Publication Data

US 2006/0087626 A1    Apr. 27, 2006

(51) Int. Cl.
  *G03B 21/00* (2006.01)
  *G03B 21/14* (2006.01)
(52) U.S. Cl. .......................... 353/69; 353/121
(58) Field of Classification Search .................. 353/30, 353/69, 70, 121; 352/140
  See application file for complete search history.

(56) References Cited

U.S. PATENT DOCUMENTS

| | | | |
|---|---|---|---|
| 5,386,257 A | 1/1995 | Swartwood | |
| 5,422,693 A | 6/1995 | Vogeley et al. | |
| 5,795,046 A | 8/1998 | Woo | |
| 5,836,664 A | 11/1998 | Conner et al. | |
| 5,847,784 A | 12/1998 | Finnila et al. | |
| 6,416,186 B1 | 7/2002 | Nakamura | |
| 6,554,431 B1 | 4/2003 | Binsted et al. | |
| 6,592,228 B1 | 7/2003 | Kawashima et al. | |
| 6,597,410 B1 | 7/2003 | Doany et al. | |
| 6,670,603 B2 * | 12/2003 | Shimada et al. | 250/235 |
| 6,846,081 B2 * | 1/2005 | Mochizuki et al. | 353/70 |
| 6,877,864 B1 * | 4/2005 | Tamura et al. | 353/70 |
| 7,055,958 B2 * | 6/2006 | Tajima | 353/69 |
| 7,125,122 B2 * | 10/2006 | Li et al. | 353/31 |
| 2002/0105623 A1 | 8/2002 | Pinhanez | |
| 2003/0123031 A1 | 7/2003 | Nelson et al. | |
| 2004/0165154 A1 * | 8/2004 | Kobori et al. | 353/69 |

\* cited by examiner

*Primary Examiner*—Melissa Jan Koval
(74) *Attorney, Agent, or Firm*—James R. McDaniel

(57) ABSTRACT

A method for indicating required movement of a projector relative to a display surface, wherein the projector has an auto-focusing range, the method comprising; measuring the distance between the projector and the display surface, determining, from the measured distance and the auto focusing range, a required movement of the projector relative to the display surface, and providing feedback to indicate the required movement of the projector relative to the display surface.

39 Claims, 7 Drawing Sheets

PROJECTOR ALIGNMENT METHOD AND USER INTERFACE

BACKGROUND OF THE INVENTION

1. Field of the Invention

This invention relates to a method for indicating required movement of a projector relative to a display surface, wherein the projector has an auto-focusing range, the method comprising; measuring the distance between the projector and the display surface, determining, from the measured distance and the auto focusing range, a required movement of the projector relative to the display surface, and providing feedback to indicate the required movement of the projector relative to the display surface.

2. Description of the Related Art

Prior to the present invention, as set forth in general terms above and more specifically below, it is known, in the projector art, to employ a projector system which automatically focuses the projector. While currently projectors are designed with auto focusing systems, the user must utilize trial and error in order to set up the projector within the allowable distance range of the optics/focusing system of the projector. Also, the user must employ his/her own visual feedback on the rotation of the image with respect to the display surface in order to achieve a rectangularly appropriate image. As can be seen, while these automatic focusing systems have met with a modicum of success, they do not provide feedback to the user to allow the user to focus/align the projector. Consequently, a more advantageous system, then, would be provided if the system provided feedback to the user to allow the user to focus/align the projector.

It is apparent from the above that there exists a need in the projector art for a projector system that provides feedback to the user to allow the user to focus/align the projector. It is a purpose of this invention to fulfill this and other needs in the art in a manner more apparent to the skilled artisan once given the following disclosure.

SUMMARY OF THE INVENTION

Generally speaking, an embodiment of this invention fulfills these needs by providing a method for indicating required movement of a projector relative to a display surface, wherein the projector has an auto-focusing range, the method comprising; measuring the distance between the projector and the display surface, determining, from the measured distance and the auto focusing range, a required movement of the projector relative to the display surface, and providing feedback to indicate the required movement of the projector relative to the display surface.

In certain preferred embodiments, the feedback consists of utilizing various LED patterns to prompt the user to manually alter the screen aspect ratio/alignment of the projector.

In another further preferred embodiment, the projector system provides an easy to use interface to quickly achieve alignment of a projector in a single try and can be used to reduce the overall optics/focusing systems range requirements.

The preferred projector alignment system, according to various embodiment of the present invention, offers the following advantages: ease-of-use; excellent projector alignment characteristics; excellent projector range determination characteristics; good durability; and good economy. In fact, in many of the preferred embodiments, these factors of ease-of-use, excellent projector alignment characteristics, and excellent projector range determination characteristics are optimized to an extent that is considerably higher than heretofore achieved in prior, known projector alignment systems.

The above and other features of the present invention, which will become more apparent as the description proceeds, are best understood by considering the following detailed description in conjunction with the accompanying drawings, wherein like characters represent like parts throughout the several views and in which:

DETAILED DESCRIPTION OF THE INVENTION

As discussed above, using a mobile projection system in many environments requires the user to determine by trial and error an appropriate distance from the display surface to allow focusing within the projector's range and rotation orientation to ensure that the projector is parallel to the display surface. To assist the user in quickly finding the optimal distance from the display surface as well as the rotation, the present invention provides a visual interface that guides the user towards a quick, accurate alignment.

Figure 1:
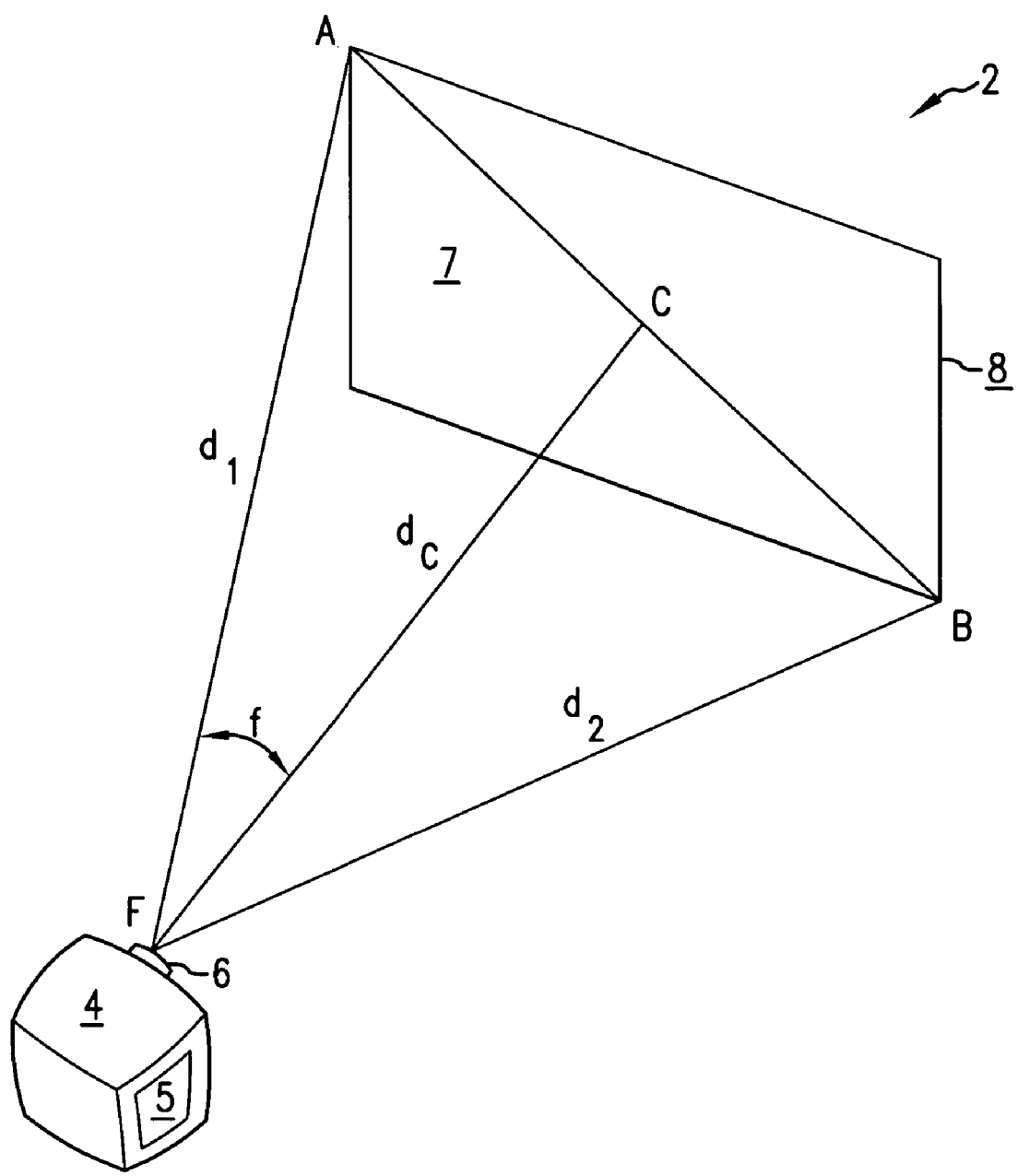
FIG. 1 is a schematic illustration of a projector alignment method and user interface, according to one embodiment of the present invention.

With reference first to FIG. 1, there is illustrated one preferred embodiment for use of the concepts of this invention. FIG. 1 illustrates projector alignment apparatus 2. Projector alignment apparatus 2 includes, in part, projector 4, microprocessor 5, projector lens 6, image 7, and conven tional display surface 8. Projector 4 projects an image 7 out of projector lens 6 towards display surface 8. It is to be understood that all the information necessary to guide the user to determine the proper distance and rotation can be obtained with two distance measurements referenced from projector 4; distance (dc) to the center of display surface 8, and distance (d1) to either the upper left-hand corner (A) or the distance (d2) to the lower right hand corner (B). It is to be further understood that passive or active distance measuring techniques can be employed. Once d1 (or d2) and dc are known, microprocessor 5 is utilized in order to determine what movement needs to take place to ensure proper display surface alignment and distance regiment within the system capability.

The projection angle (f) is set by the optics design and projection settings. This angle value is utilized to compare the dc/d1 ratio to determine if the projector image 7 is skewed to the left or the right. The relationship between the projection angle (f) and the two distances is given by the following equation (1):

$$dc/d1 = \cos f.\qquad \text{Eq. 1}$$

If the measured ratio is less than the expected value for the given value of dc/d1, then the user interface will indicate to the user to rotate projector 4 in a clockwise manner. Conversely, if the ratio is larger than the expected value, the user interface will indicate to the user to rotate projector 4 in a counterclockwise manner. This provides a very accurate system of determining proper display surface aspect ratio/alignment without relying only on visual judgment. It is to be understood that the distance (dc) alone is utilized determine if the distance from the center of the intended projection image is within the auto focus adjustment range of the optics of projector 4. It is to be further understood that once the distance calculations have been made, the user interface will immediately provide guidance to the user on how to adjust the position and orientation of projector 4.

With respect to the user interface, a series of graphics lit by LEDs will guide the user to determine the proper distance from display surface 8 and the rotation of projector 4. Preferably, the LEDs can be located on projector 4 and/or can be projected as part of the image upon display surface 8. As discussed further, rotation alignment is designated by a series of LEDs showing which direction to rotate (FIGS. 2-5) and how far to move projector 4 towards/away from display surface 8 (FIGS. 6-9). It is to be understood that the actual LED orientation can be accomplished in a number of ways, including multicolor LEDs. Also, various audio, sensory or a combination of visual, audio, and sensory indicators can be employed to accomplish the same goal.

Figure 2:
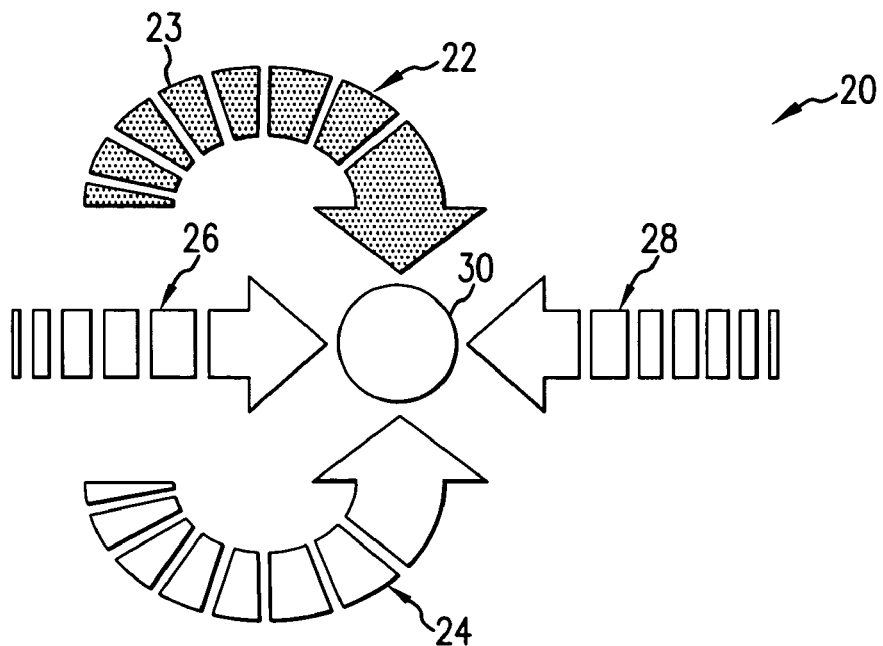
FIG. 2 is a schematic illustration of a visual interface that guides the user to achieve clockwise alignment, according to another embodiment of the present invention.

With respect to FIG. 2, there is illustrated an LED display 20. LED display 20 includes, in part, clockwise rotation indicators 22, 23, counterclockwise rotation indicator 24, movement towards display surface 8 indicator 26, movement away from display surface 8 indicator 28, and acceptable alignment indicator 30. As shown in FIG. 2, LEDs 23 in clockwise rotation indicator 22 are illuminated in order to inform the user that projector 4 must be rotated in a clockwise direction with respect to display surface 8 in order to properly align the image 7 on display surface 8.

Figure 3:
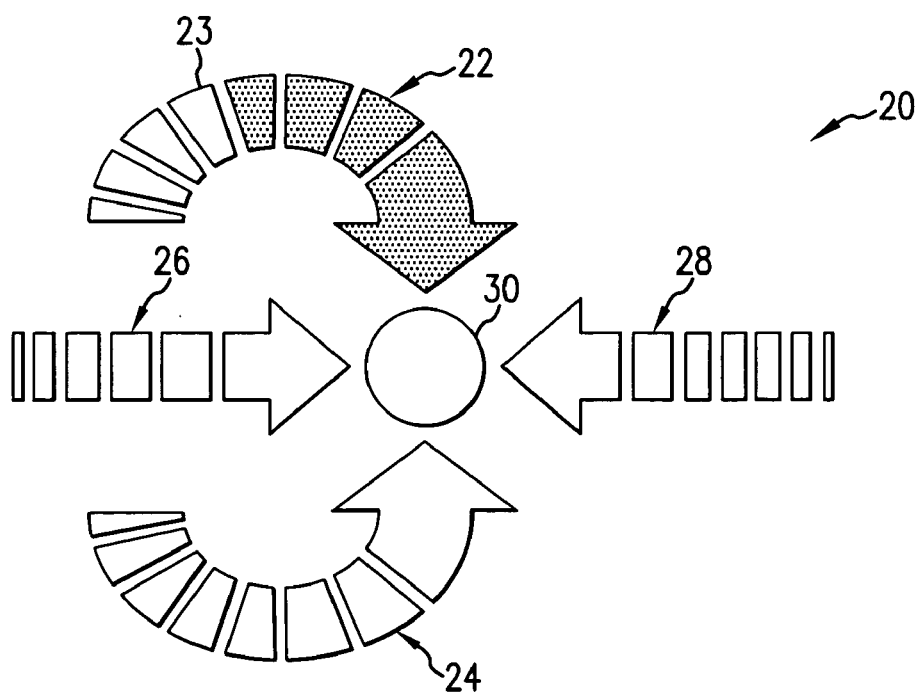
FIG. 3 is a schematic illustration of a visual interface that guides the user to achieve further clockwise alignment, according to another embodiment of the present invention.

As can be seen in FIG. 3, fewer LEDs 23 are illuminated. As the user rotates projector 4 in a clockwise rotation towards the ideal orientation of the image 7 with respect to display surface 8, fewer LEDs 23 within clockwise rotation indicator 22 are illuminated. Once all of the LEDs 23 within clockwise rotation indicator 22 have been un-illuminated, the user can be assured that projector 4 has been properly aligned in the clockwise rotation with respect to display surface 8.

Figure 4:
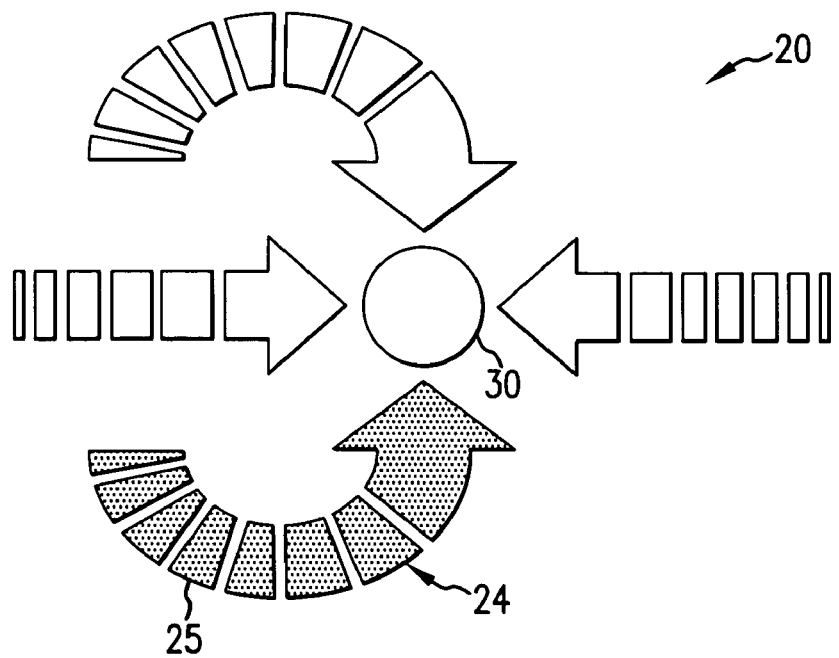
FIG. 4 is a schematic illustration of a visual interface that guides the user to achieve counterclockwise alignment, according to another embodiment of the present invention.

As shown in FIG. 4, LEDs 25 in counterclockwise rotation indicator 24 are illuminated in order to inform the user that projector 4 must be rotated in a counterclockwise direction with respect to display surface 8 in order to properly align the image 7 on display surface 8.

Figure 5:
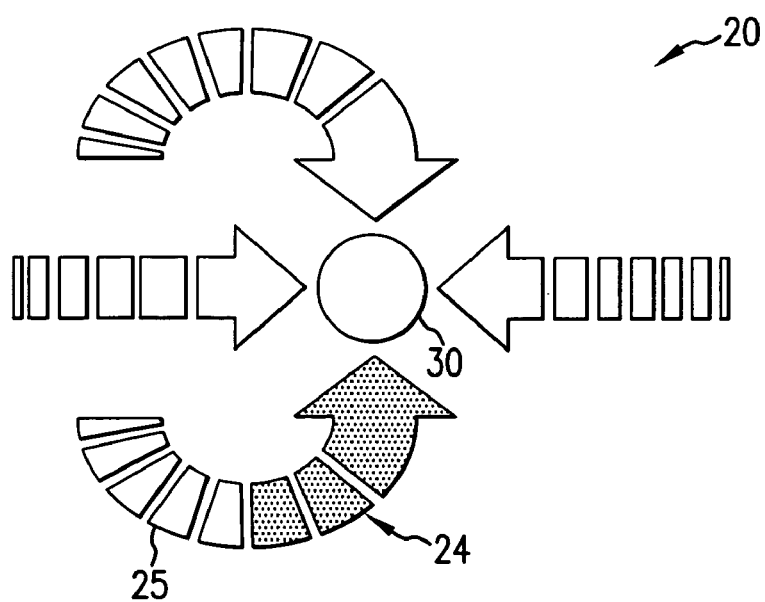
FIG. 5 is a schematic illustration of a visual interface that guides the user to achieve further counterclockwise alignment, according to another embodiment of the present invention.

As shown in FIG. 5, fewer LEDs 25 are illuminated. As discussed above with respect to FIG. 3, as the user rotates projector 4 in a counterclockwise rotation towards the ideal orientation of the image 7 with respect to display surface 8, fewer LEDs 25 within counterclockwise rotation indicator 24 are illuminated. Once all of the LEDs 25 within counterclockwise rotation indicator 24 have been un-illuminated, the user can be assured that projector 4 has been properly aligned in the counterclockwise rotation with respect to display surface 8.

Figure 6:
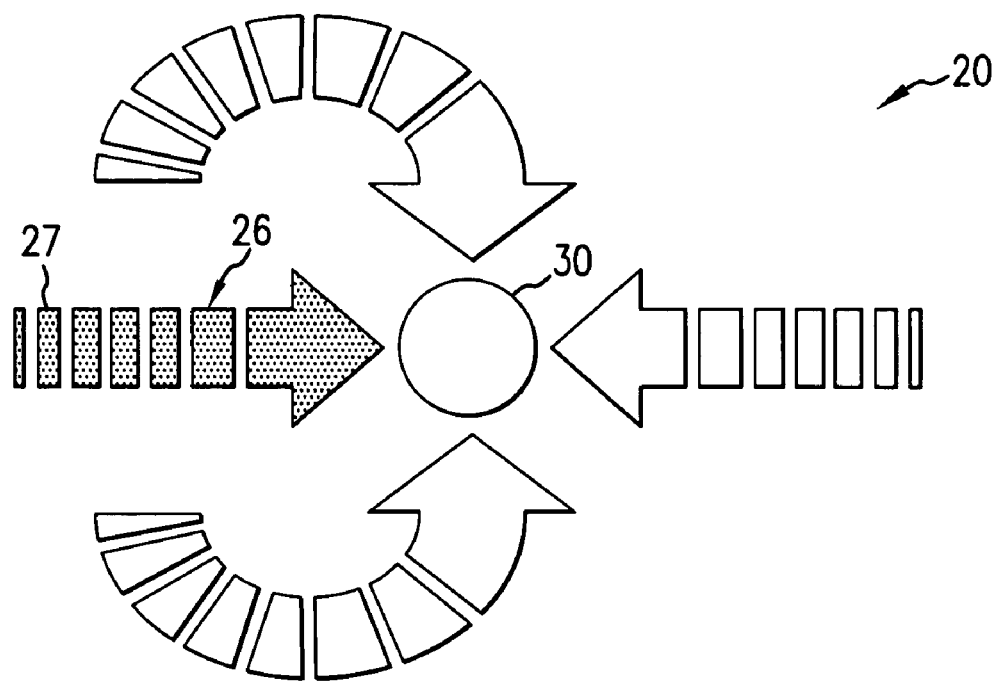
FIG. 6 is a schematic illustration of a visual interface that guides the user to achieve forward alignment, according to another embodiment of the present invention.

With respect to FIG. 6, distance indicators 26 and 28 (FIGS. 8 and 9) are used to assist the user in properly determining the range of projector 4 with respect to display surface 8. As can be seen in FIG. 6, forward distance indicator 26 includes LEDs 27. LEDs 27 in forward movement indicator 26 are illuminated in order to inform the user that projector 4 must be moved forward with respect to display surface 8 in order to properly focus the image 7 on display surface 8.

Figure 7:
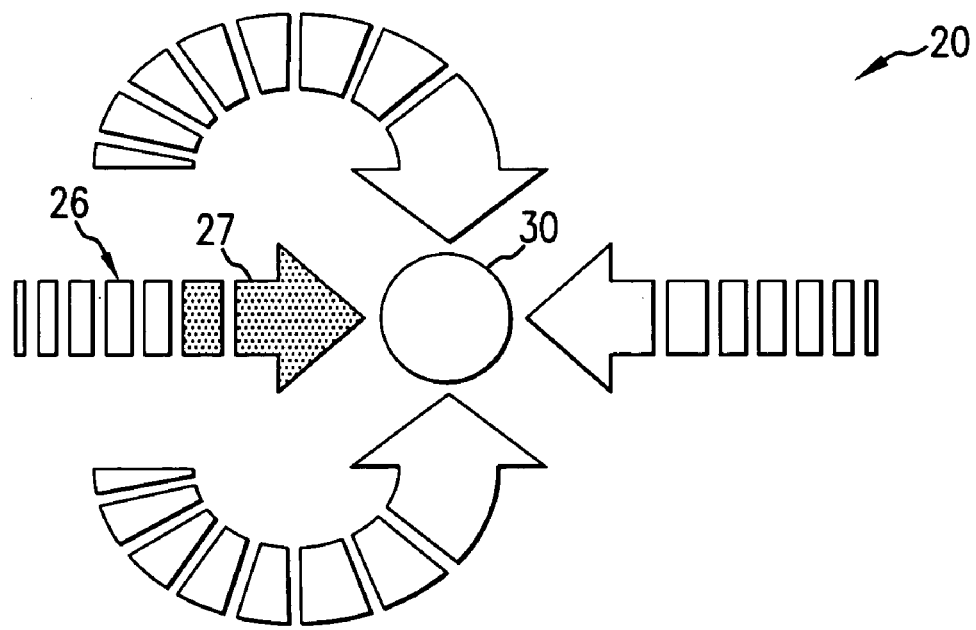
FIG. 7 is a schematic illustration of a visual interface that guides the user to achieve further forward alignment, according to another embodiment of the present invention.

As shown in FIG. 7, fewer LEDs 27 are illuminated. As discussed above with respect to FIG. 3, as the user moves projector 4 towards display surface 8, fewer LEDs 27 within forward movement indicator 26 are illuminated. Once all of the LEDs 27 within forward movement indicator 26 have been un-illuminated, the user can be assured that projector 4 has been properly moved in a forward direction with respect to display surface 8.

Figure 8:
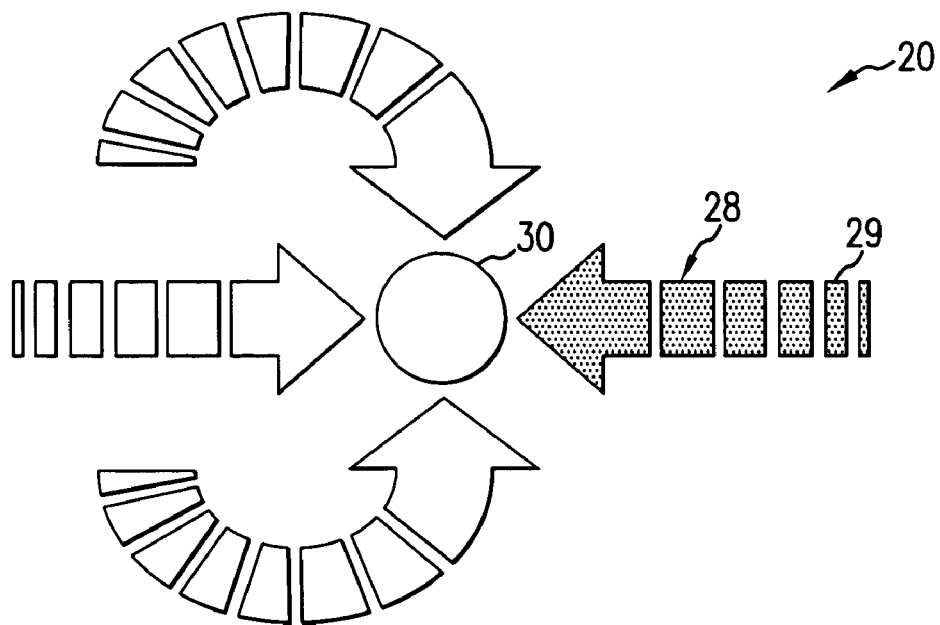
FIG. 8 is a schematic illustration of a visual interface that guides the user to achieve backward alignment, according to another embodiment of the present invention.

With respect to FIG. 8, backward distance indicator 28 includes LEDs 29. LEDs 29 in backward movement indicator 28 are illuminated in order to inform the user that projector 4 must be moved backward with respect to display surface 8 in order to properly focus the image 7 on display surface 8.

Figure 9:
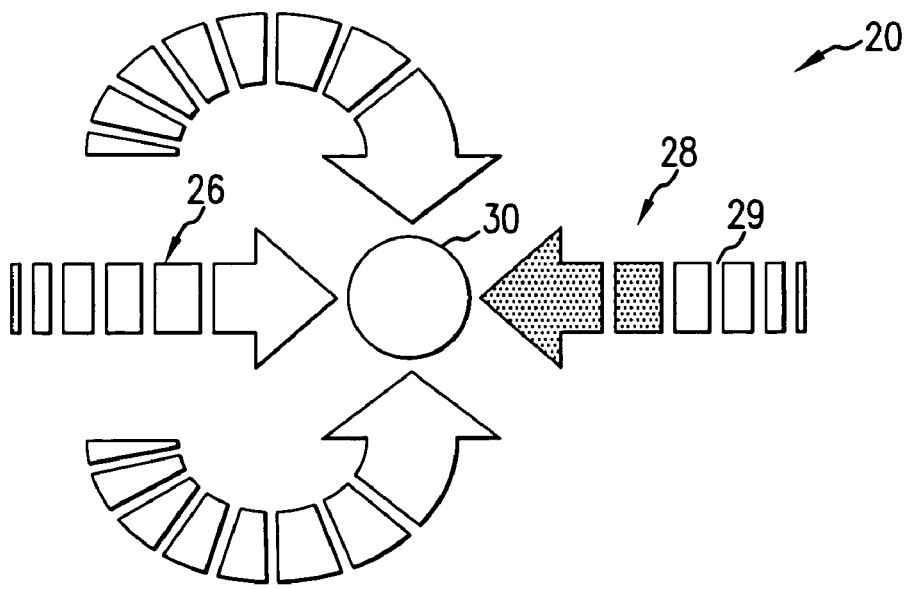
FIG. 9 is a schematic illustration of a visual interface that guides the user to achieve further backward alignment, according to another embodiment of the present invention.

As shown in FIG. 9, fewer LEDs 29 are illuminated. As discussed above with respect to FIG. 6, as the user moves projector 4 away from display surface 8, fewer LEDs 29 within backward movement indicator 28 are illuminated. Once all of the LEDs 29 within backward movement indicator 28 have been un-illuminated, the user can be assured that projector 4 has been properly moved in a backward direction with respect to display surface 8.

Figure 10:
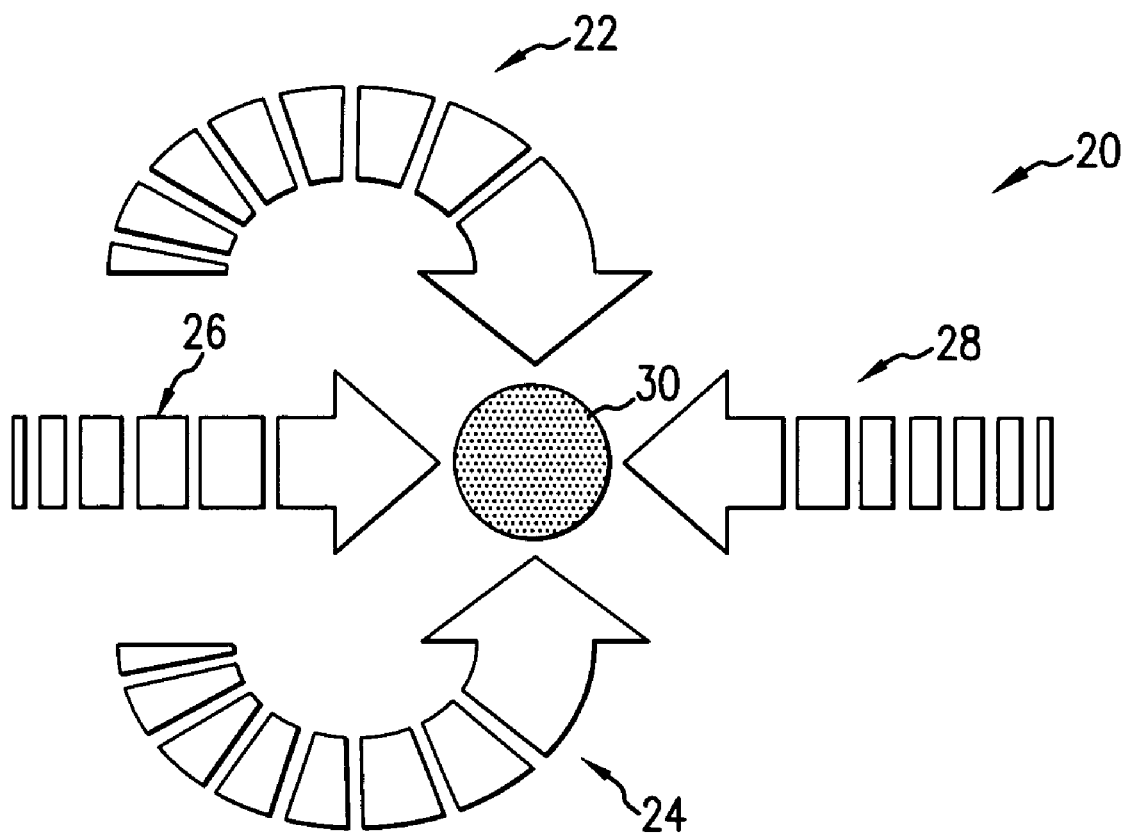
FIG. 10 is a schematic illustration of a visual interface that informs the user that the alignment is complete, according to another embodiment of the present invention.

With respect to FIG. 10, once projector 4 has been properly aligned in the clockwise and counterclockwise directions with respect to display surface 8 and projector 4 has properly focused the image 7 (with respect to the forward and backward distances between projector 4 and display surface 8), LED 30 will become illuminated. In this manner, the user is assured that projector 4 is properly aligned with respect to display surface 8 and the image is properly focused on display surface 8.

Figure 11:
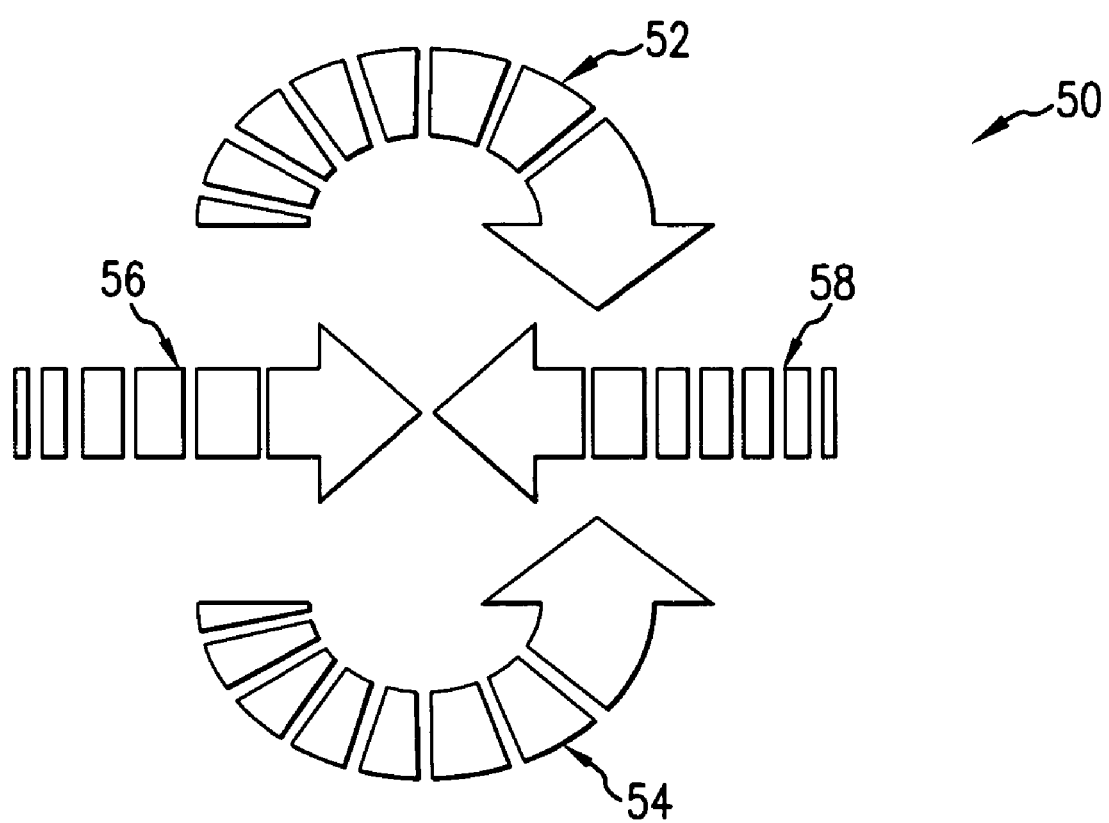
FIG. 11 is a schematic illustration of another visual interface that guides the user to achieve alignment, according to another embodiment of the present invention.

With respect to FIG. 11, there is illustrated another LED display 50. LED display 50 includes, in part, clockwise rotation indicator 52, counterclockwise rotation indicator 54, movement towards display surface 8 indicator 56, and movement away from display surface 8 indicator 58. During the operation of LED display 50, a single color LED indicator, such as clockwise rotation indicator 52, is selected. The user then rotates projector 4 in a clockwise manner with respect to display surface 8 and clockwise rotation indicator 52 will remain illuminated until projector 4 is properly rotated in the clockwise direction. The counterclockwise rotation indicator 54 is then selected and projector 4 is rotated in the counterclockwise direction with respect to display surface 8 until counterclockwise rotation indicator 54 becomes un-illuminated. The forward movement display indicator 56 is then selected and projector 4 is moved in the forward direction towards display surface 8 until forward movement display indicator 56 becomes un-illuminated. Finally, the backward movement display indicator 58 is selected and projector 4 is moved away from display surface 8 until backward movement display indicator 58 becomes un-illuminated.

Also, the present invention can be embodied in any computer-readable medium for use by or in connection with an instruction-execution system, apparatus or device such as a computer/processor based system, processor-containing system or other system that can fetch the instructions from the instruction-execution system, apparatus or device, and execute the instructions contained therein. In the context of this disclosure, a "computer-readable medium" can be any means that can store, communicate, propagate or transport a program for use by or in connection with the instruction-execution system, apparatus or device. The computer-readable medium can comprise any one of many physical media such as, for example, electronic, magnetic, optical, electromagnetic, infrared, or semiconductor media. More specific examples of a suitable computer-readable medium would include, but are not limited to, a portable magnetic computer diskette such as floppy diskettes or hard drives, a random access memory (RAM), a read-only memory (ROM), an erasable programmable read-only memory, or a portable compact disc. It is to be understood that the computer-readable medium could even be paper or another suitable medium upon which the program is printed, as the program can be electronically captured, via, for instance, optical scanning of the paper or other medium, then compiled, interpreted or otherwise processed in a single manner, if necessary, and then stored in a computer memory.

Those skilled in the art will understand that various embodiment of the present invention can be implemented in hardware, software, firmware or combinations thereof. Separate embodiments of the present invention can be implemented using a combination of hardware and software or firmware that is stored in memory and executed by a suitable instruction-execution system. If implemented solely in hardware, as in an alternative embodiment, the present invention can be separately implemented with any or a combination of technologies which are well known in the art (for example, discrete-logic circuits, application-specific integrated circuits (ASICs), programmable-gate arrays (PGAs), field-programmable gate arrays (FPGAs), and/or other later developed technologies. In preferred embodiments, the present invention can be implemented in a combination of software and data executed and stored under the control of a computing device.

It will be well understood by one having ordinary skill in the art, after having become familiar with the teachings of the present invention, that software applications may be written in a number of programming languages now known or later developed.

Once given the above disclosure, many other features, modifications or improvements will become apparent to the skilled artisan. Such features, modifications or improvements are, therefore, considered to be a part of this invention, the scope of which is to be determined by the following claims.

What is claimed is:

1. A method for indicating required movement of a projector relative to a display surface, wherein the projector has an auto-focusing range, the method comprising:
   measuring the distance between the projector and the display surface;
   determining, from the measured distance and the auto-focusing range that the distance between the projector and the display surface is outside of the auto-focusing range thereby requiring a movement of the projector relative to the display surface by a user; and
   providing feedback to the user to indicate the required movement of the projector relative to the display surface.

2. The method, as in claim 1, wherein the measuring step is further comprised of:
   measuring a distance between the projector and a center of the display surface;
   measuring a distance between the projector and at least one corner of the display surface.

3. The method, as in claim 2, wherein the determining step is further comprised of:
   determining a relationship between a projection angle and the measured distance between the projector and the center of the display surface and the distance between the projector and the at least one corner of the display surface in order to determine a proper screen aspect ratio/alignment.

4. The method, as in claim 2, wherein the determining step is further comprised of:
   utilizing the measured distance between the projector and the center of the display surface in order to determine a focal adjustment range.

5. The method, as in claim 1, wherein the providing feedback step is further comprised of:
   utilizing a plurality of LEDs to provide feedback to the user.

6. The method, as in claim 5, wherein the LEDs are further comprised of:
   at least one LED that is utilized to properly orient the projector in a clockwise manner with respect to the display surface.

7. The method, as in claim 5, wherein the LEDs are further comprised of:
   at least one LED that is utilized to properly orient the projector in a counterclockwise manner with respect to the display surface.

8. The method, as in claim 5, wherein the LEDs are further comprised of:
   at least one LED that is utilized to properly locate the projector in a forward direction manner with respect to the display surface.

9. The method, as in claim 5, wherein the LEDs are further comprised of:
   at least one LED that is utilized to properly locate the projector in a backward direction manner with respect to the display surface.

10. The method, as in claim 5, wherein the LEDs are further comprised of:
    at least one LED that is utilized to inform the user that the projector is properly aligned with respect to the display surface.

11. A projector for projecting on to a display surface, comprising:
- a focusing system configured to automatically focus an image on the display device, while the distance between the projector in the display surface is within an auto-focusing range;
- an assessor continued to measure a distance between the projector and the display surface;
- a processor configured to determine, from the measured distance and the auto-focusing range that the distance between the projector and the display surface is outside of the auto-focusing range thereby requiring a, movement of the projector relative to the display surface by a user; and
- a user interface configured to provide feedback to the user to indicate the required movement of the projector relative to the display surface.

12. The projector, as in claim 11, wherein the user interface is further comprised of:
- a plurality of LEDs to provide feedback to the user.

13. The projector, as in claim 12, wherein the LEDs are further comprised of:
- at least one LED that is utilized to properly orient the projector in a clockwise manner with respect to the display surface.

14. The projector, as in claim 12, wherein the LEDs are further comprised of:
- at least one LED that is utilized to properly orient the projector in a counterclockwise manner with respect to the display surface.

15. The projector, as in claim 12, wherein the LEDs are further comprised of:
- at least one LED that is utilized to properly locate the projector in a forward direction manner with respect to the display surface.

16. The projector, as in claim 12, wherein the LEDs are further comprised of:
- at least one LED that is utilized to properly locate the projector in a backward direction manner with respect to the display surface.

17. The projector, as in claim 12, wherein the LEDs are further comprised of:
- at least one LED that is utilized to inform the user that the projector is properly aligned with respect to the display surface.

18. The projector, as in claim 11, wherein the user interface is further comprised of:
- an audio indicator to provide feedback to the user.

19. The projector, as in claim 11, wherein the user interface is further comprised of:
- a sensory indicator to provide feedback to the user.

20. A system for projecting on to a display surface, the system comprising:
- measuring the distance between the projector and the display surface;
- determining, from the measured distance and the auto-focusing range that the distance between the projector and the display surface is outside of the auto-focusing range thereby requiring a movement of the projector relative to the display surface by a user; and
- providing feedback to the user to indicate the required movement of the projector relative to the display surface.

21. The system, as in claim 20, wherein the measuring means is further comprised of:
- measuring a distance between the projector and a center of the display surface;
- measuring a distance between the projector and at least one corner of the display surface.

22. The system, as in claim 21, wherein the determining means is further comprised of:
- determining a relationship between a projection angle and the measured distance between the projector and the center of the display surface and the distance between the projector and the at least one corner of the display surface in order to determine a proper screen aspect ratio/alignment.

23. The system, as in claim 21, wherein the determining means is further comprised of:
- utilizing the measured distance between the projector and the center of the display surface in order to determine a focal adjustment range.

24. The system, as in claim 20, wherein the feedback means is further comprised of:
- utilizing a plurality of LEDs to provide feedback to the user.

25. The system, as in claim 24, wherein the LEDs are further comprised of:
- at least one LED that is utilized to properly orient the projector in a clockwise manner with respect to the display surface.

26. The system, as in claim 24, wherein the LEDs are further comprised of:
- at least one LED that is utilized to properly orient the projector in a counterclockwise manner with respect to the display surface.

27. The system, as in claim 24, wherein the LEDs are further comprised of:
- at least one LED that is utilized to properly locate the projector in a forward direction manner with respect to the display surface.

28. The system, as in claim 24, wherein the LEDs are further comprised of:
- at least one LED that is utilized to properly locate the projector in a backward direction manner with respect to the display surface.

29. The system, as in claim 24, wherein the LEDs are further comprised of:
- at least one LED that is utilized to inform the user that the projector is properly aligned with respect to the display surface.

30. A program storage system readable by a computer, tangibly embodying a program, applet, or instructions executable by the computer to perform method steps for indicating required movement of a projector relative to a display surface, wherein the projector has an auto-focusing range, the method comprising:
- measuring the distance between the projector and the display surface;
- determining, from the measured distance and the auto-focusing range that the distance between the projector and the display surface is outside of the auto-focusing range thereby requiring, movement of the projector relative to the display surface by a user; and
- providing feedback to the user to indicate the required movement of the projector relative to the display surface.

31. The method, as in claim 30, wherein the measuring step is further comprised of:
- measuring a distance between the projector and a center of the display surface;
- measuring a distance between the projector and at least one corner of the display surface.

32. The method, as in claim 31, wherein the determining step is further comprised of:
  determining a relationship between a projection angle and the measured distance between the projector and the center of the display surface and the distance between the projector and the at least one corner of the display surface in order to determine a proper screen aspect ratio/alignment.

33. The method, as in claim 31, wherein the determining step is further comprised of:
  utilizing the measured distance between the projector and the center of the display surface in order to determine a focal adjustment range.

34. The method, as in claim 30, wherein the providing feedback step is further comprised of:
  utilizing a plurality of LEDs to provide feedback to the user.

35. The method, as in claim 30, wherein the LEDs are further comprised of:
  at least one LED that is utilized to properly orient the projector in a clockwise manner with respect to the display surface.

36. The method, as in claim 30, wherein the LEDs are further comprised of:
  at least one LED that is utilized to properly orient the projector in a counterclockwise manner with respect to the display surface.

37. The method, as in claim 34, wherein the LEDs are further comprised of:
  at least one LED that is utilized to properly locate the projector in a forward direction manner with respect to the display surface.

38. The method, as in claim 34, wherein the LEDs are further comprised of:
  at least one LED that is utilized to properly locate the projector in a backward direction manner with respect to the display surface.

39. The method, as in claim 34, wherein the LEDs are further comprised of:
  at least one LED that is utilized to inform the user that the projector is properly aligned with respect to the display surface.

* * * * *